United States Patent [19]

Anderson

[11] 4,327,932
[45] May 4, 1982

[54] OVERLAPPED FOLDING BEAM IMPLEMENT

[75] Inventor: Carl M. Anderson, Claremore, Okla.

[73] Assignee: Hesston Corporation, Hesston, Kans.

[21] Appl. No.: 203,116

[22] Filed: Oct. 27, 1980

[51] Int. Cl.³ .................... A01B 5/06; A01B 73/00; A01B 21/08

[52] U.S. Cl. .................. 280/411 A; 172/311; 172/587; 280/411 C; 280/656

[58] Field of Search ............. 172/240, 311, 456, 568, 172/580, 581, 584, 585, 586, 587, 588, 591, 594, 595, 596, 662; 280/411 R, 411 A, 411 B, 411 C, 412, 413, 656

[56] References Cited

U.S. PATENT DOCUMENTS

| | | | |
|---|---|---|---|
| 3,327,787 | 6/1967 | Adee | 172/311 |
| 3,830,313 | 8/1974 | Frazer et al. | 172/581 |
| 4,002,334 | 1/1977 | Wilbeck | 172/581 |
| 4,223,743 | 9/1980 | Garrison | 172/587 X |
| 4,236,585 | 12/1980 | Adee et al. | 172/587 |
| 4,271,912 | 6/1981 | Frye | 172/595 X |

*Primary Examiner*—Richard T. Stouffer
*Attorney, Agent, or Firm*—Schmidt, Johnson, Hovey & Williams

[57] ABSTRACT

The tillage implement has tool beam assemblies that project laterally outwardly in opposite directions from the central fore-and-aft axis of the implement, and the inboard ends of the assemblies are overlapped transversely with respect to the path of travel of the implement while also being offset in a fore-and-aft direction so that the soil worked by the inboard end of the leading tool assembly is reworked by the inboard end of the trailing tool assembly to eliminate the formation of a furrow or ridge at the point of convergence of the tool assemblies. Notwithstanding the overlap and offset, the assemblies may be swung back into folded positions for transport in which the assemblies are substantially parallel to one another in order to reduce the overall roading width of the implement.

7 Claims, 3 Drawing Figures

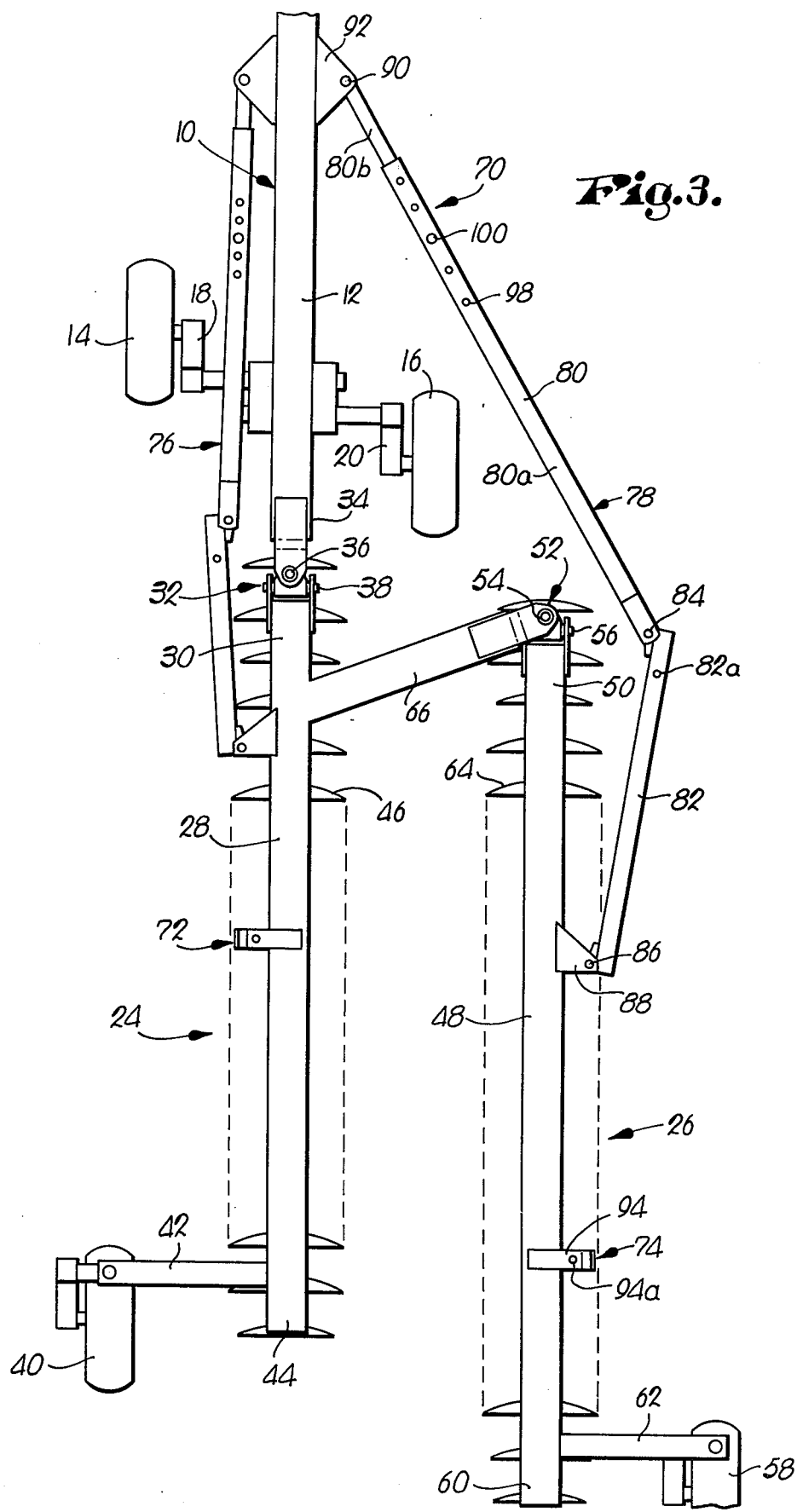

OVERLAPPED FOLDING BEAM IMPLEMENT

TECHNICAL FIELD

This invention relates to the field of tillage implements and, more particularly, to those which may be folded inwardly from widespread field-working positions to a narrowed width for roading.

BACKGROUND ART

As increasingly large tillage implements become available to match the available power of modern tractors, the problem must also be addressed of how to design such widespread, massive implements for folding into more compact, narrow widths for roading and passage through gates and the like. Various and sundry folding arrangements have heretofore been provided to serve this purpose, with varying degrees of success.

For example, one arrangement which has been very well accepted is disclosed and claimed in pending application Ser. No. 927,957 filed July 26, 1978, now U.S. Pat. No. 4,236,585, in the names of Raymond A. Adee, et al. and titled "Foldback Implement Frame having Angle Adjustment", said application being assigned to the assignee of the present invention. There the tool beams which support ground-working discs project from opposite sides of the machine in a forwardly diverging manner. The beams may be folded back into a parallel arrangement for roading purposes, and articulated tension linkage between the central tongue of the implement and the beams holds the latter releasably in their normal working positions.

However, some difficulties have been experienced in a machine of that type with respect to the creation of a ridge or furrow of unworked soil at the point of convergence of the tool beams as a result of the spacing between the two innermost discs on opposite sides of the machine and the tendency of those discs to throw the soil outwardly from the center line in opposite directions.

SUMMARY OF THE PRESENT INVENTION

Accordingly, one important object of the present invention is to provide an implement which retains the fold-up features found in the machine set forth in said application yet which overcomes the tendency of the implement to produce a ridge or furrow at the point of convergence of the two oppositely diverging tool assemblies. To this end, the present invention contemplates arranging the opposite tool assemblies in an offset, overlapped relationship in the area of their convergence so that, instead of the inboardmost discs of the two assemblies being spaced side-by-side and parting the soil to throw it in opposite, outward directions away from the center line, one of the assemblies trails the other and partially reworks that inboard portion immediately previously worked by the leading assembly. Therefore, even the soil along the center of the machine is worked and turned to the same extent as all other areas engaged by the machine. Both of the assemblies are pivoted about vertical axes to permit rearward folding. While the pivot for the lead assembly is located at the rear of the main frame, the pivot for the trailing assembly is carried by a rearwardly extending arm of the lead assembly. Articulated tension linkage connected between the main frame of the machine and the two assemblies may be latched against articulation to hold the assemblies in their widespread working positions or unlatched to permit foldback of the assemblies for transport.

BRIEF DESCRIPTION OF THE DRAWING

FIG. 3 is a fragmentary top plan view similar to FIG. 1 of the implement but with the tool assemblies folded back into their roading positions for transport.

DETAILED DESCRIPTION

Figures 1, 2:
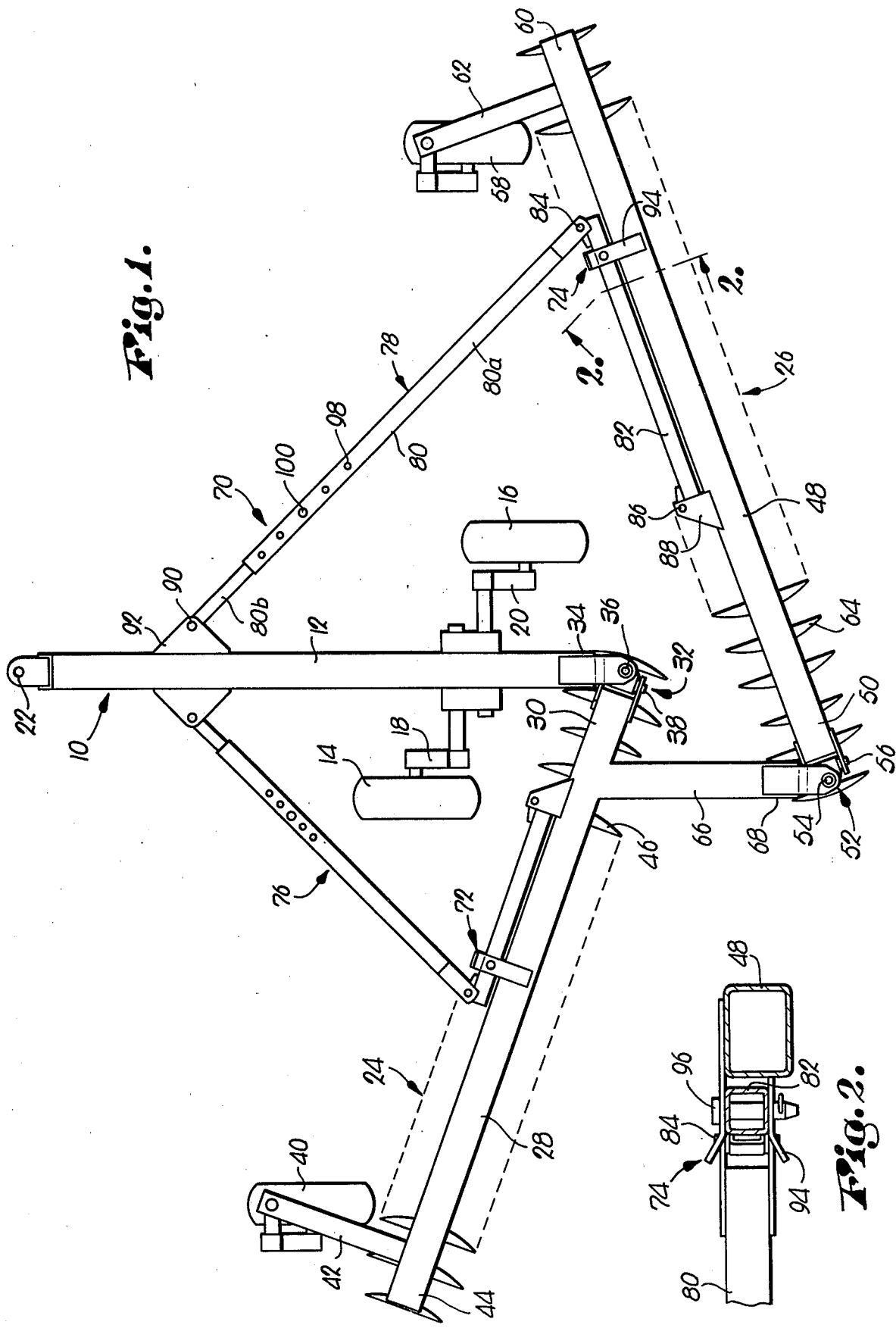
FIG. 1 is a top plan view of an implement embodying the principles of the present invention.
FIG. 2 is an enlarged, fragmentary cross-sectional view through one assembly of the implement taken substantially along line 2—2 of FIG. 1 and illustrating the latching arrangement for holding the tension link of that assembly against articulation.

The implement has a main frame 10 that includes a fore-and-aft extending member 12 supported by ground wheels 14 and 16. The wheels 14,16 are attached to the member 12 via pivoting arms 18 and 20 respectively so that the wheels 14,16 may be raised and lowered relative to the member 12 through suitable power means not shown but well understood by those skilled in the art, such power means taking the form, for example, of fluid pressure piston and cylinder assemblies. Wheels 14,16 thereby adapt the frame 10 for travel and also determine the height at which the member 12 is disposed above the ground as controlled by the operating means for the arms 18,20. A hitch 22 at the forwardmost end of the member 12 adapts the frame 10 for coupling to a towing vehicle or the like (not shown).

The implement also includes a pair of elongated tool assemblies 24 and 26 respectively mounted on the frame 10 for movement therewith along a path of travel defined essentially by the longitudinal axis of the member 12. The left assembly 24 includes a beam 28 having an inboard end 30 provided with a coupling 32 which directly attaches the beam 28 to the member 12 at its rear end 34, said coupling 32 including a vertical pivot 36 that adapts the assembly 24 for horizontal swinging movement between its widespread position of FIG. 1 and its folded-back position in FIG. 3. The coupling 32 also includes a horizontal pivot 38 that permits the assembly 24 to swing vertically as necessary to compensate for changes in ground contour experienced by an outboard caster wheel 40 depending from a fore-and-aft extending wheel bracket 42 rigidly affixed to the outboard end 44 of the beam 28 on the normally forward side thereof. Although not shown, it is to be understood that the caster wheel 40 is attached to the beam 28 in a manner functionally similar to the attachment of the wheels 14,16 to the member 12 such that the caster wheel 40 may be raised and lowered with respect to the beam 28 to control the height of the latter. Preferably, power means such as a piston and cylinder assembly is connected to the wheel 40 for effecting such raising and lowering thereof, and this operation is coordinated with raising and lowering of the wheels 14,16 so that member 12 and tool assembly 24 are raised and lowered at the same time and to the same extent.

A set of earthworking tools, such as the gang of discs 46, is attached to the beam 28 beneath the latter for working the soil as the implement is drawn along its path of travel and when the various wheels of the implement have been raised to such an extent as to lower the discs 46 into the ground. As illustrated, the beam 28 projects outwardly and forwardly when in the widespread position of FIG. 1, and the discs 46 are so oriented in this position of the beam 28 as to engage and throw the soil outwardly and to the rear while the implement moves forwardly.

The opposite tool assembly 26 is similar in construction to the assembly 24, having a beam 48 provided with an inboard end 50; a coupling 52 at said inboard end 50 that permits horizontal swinging of the assembly 26 about a vertical pivot 54 and vertical swinging about a horizontal pivot 56; a caster wheel 58 attached to the outboard end 60 of the beam 48 by bracket 62 in the same raising and lowering manner as the caster wheel 40 is attached to the bracket 42; and a series or gang of ground-engaging discs 64 located beneath the beam 48 along the length thereof and disposed symmetrically with respect thereto. Contrary to the beam 28, however, the beam 48 is not directly connected to the member 12 but is rather connected thereto in an indirect sense through a rigid arm 66 integral with the beam 28 and projecting rearwardly therefrom when the latter is in its widespread position of FIG. 1. The coupling 52 for the tool assembly 26 is located at the normally rear end 68 of the arm 66, the arm 66 being spaced outwardly from the inboard end 30 of beam 28 such as to likewise space the vertical pivot 54 of tool assembly 26 leftwardly outboard of the vertical pivot 36 of the tool assembly 24. This arrangement has the effect of offsetting the inboard ends of the tool assemblies 24 and 26 in a fore-and-aft sense with respect to the direction of travel of the implement and also overlapping such inboard ends in a transverse sense so that the tool assembly 24 leads while the tool assembly 26 trails. As a result of the vertical pivot 54, the tool assembly 26 may be swung between its widespread position of FIG. 1 and its folded-back position of FIG. 3.

The tool assemblies 24 and 26 are provided with means for releasably holding the same in their widespread position of FIG. 1, such means including linkage broadly denoted by the numeral 70 and a pair of latches 72,74. The linkage 70 includes a pair of articulated tension links 76 and 78 for the assemblies 24 and 26 respectively, each of the links 76,78 including an inner section 80 and an outer section 82 pivotally interconnected by a vertical pivot pin 84. The outer section 82 is pivoted at its outer end by a pin 86 to an ear 88 on the corresponding beam 28 or 48, while the inner end of the inner section 80 is pivoted via a vertical pin 90 to a laterally projecting lug 92 on the member 12 rearwardly adjacent the hitch 22.

As shown with respect to the latch 74 in FIG. 2, each of the latches 72,74 includes a yoke 94 projecting forwardly from the corresponding beam 28 or 48 and disposed to removably accept and receive the outer section 82 of the link 76 or 78 when the same is in its buckled or folded position of FIG. 1. Each latch 72,74 further includes its own kingpin 96 which may be inserted through aligned holes 94a and 82a (FIG. 3) in the yoke 94 and the received outer section 82 respectively for the purpose of keeping the section 82 within the yoke 94 and alongside the front extremity of the beam 28 or 48.

The latches 72 and 74 illustrated herein are by way of example only, it being understood that variations of this specific illustrated arrangement could be made by those skilled in the art to permit, for example, mechanized latching and unlatching of the outer sections 82.

It is also to be pointed out that the inner sections 80 of the links 76,78 are selectively telescopic in nature for purposes of adjusting the angle of the assemblies 24,26 with respect to the path of travel of the implement. To this end, each inner section 80 includes a tubular portion 80a telescopically receiving a second portion 80b, the two portions 80a,80b having respective series of holes 98, any registered pair of which may be selected to receive a locking pin 100 to thereby releasably lock the portions 80a and 80b against telescoping action and effectively determine the selected length of the inner section 80.

OPERATION

The implement is normally drawn through the field with the tool assemblies 24 and 26 in their widespread positions of FIG. 1. The wheels 14, 16, 40 and 58 may be used in the nature of gage wheels at this time to prevent the discs 46 and 64 from penetrating the soil more deeply than the desired extent. Because the inboard portion of the tool assembly 26 trails the corresponding inboard portion of the tool assembly 24, no unworked central strip of soil is left behind by the implement; the field is evenly and completely worked over all areas covered by the implement.

When it is desired to fold up the implement to its FIG. 3 condition, the operator first pulls the kingpins 96 from the yokes 94 so as to release the links 76,78 from the latches 72,74. The frame 10 and the assemblies 24,26 may or may not be raised at this time depending upon the extent of reaction force obtained through the ground when the operator then pulls forwardly to start the assemblies 24,26 swinging rearwardly about their respective vertical pivots 36 and 54. As the operator continues to pull forwardly, reaction of the wheels 40,58 with the ground, and perhaps also the additional reaction of the discs 46,64 with the ground if such is needed, causes the assemblies 24,26 to swing rearwardly through individual arcs exceeding 90° into the rearwardly disposed folded position of FIG. 3 at which time the two assemblies 24,26 become substantially parallel to one another and to the path of travel of the implement. Through means not shown, and prior to folding back the assemblies 24,26, the caster wheels 40 and 58 have been released from a locked position as shown in FIG. 1 so as to be free to caster more than 90° into the dispositions of FIG. 3, at which time they may be relocked in the FIG. 3 positions to encourage the assemblies 24,26 to track properly during roading of the implement. Of course, during roading, the frame 10 and the assemblies 24,26 are fully raised to completely eliminate any ground contact of the discs 46,64. Furthermore, if desired, a stiff strap or the like may be used to span the two folded-back beams 28,48 to lock the same in parallelism and thereby facilitate roading.

It is to be noted that when the assemblies 24,26 are folded back, the tension links 76,78 are substantially unfolded or unbuckled, although they do not swing into overcenter conditions. Thus, when it is desired to once again establish the widespread position for the assemblies 24,26, the links 76 and 78 are free to buckle outwardly in the nature of elbow joints without substantially resisting the unfolding of the assemblies 24,26.

Such unfolding is a simple reversal of the above-explained process, at which time the operator simply backs the implement to rely upon reaction of the wheels 40,58 with the ground to initiate forward swinging of the assemblies 24,26. The wheels 40,58 are unlocked at this time to permit their free castering action until the condition of things illustrated in FIG. 1 is once again obtained, whereupon the wheels 40 and 58 are locked in position and the kingpins 96 are reinserted into the yokes 94 to relatch the links 76 and 78.

I claim:

1. In a tillage implement provided with a pair of elongated ground-working tool assemblies having a widespread, field-working position in which the assemblies project laterally outwardly in opposite directions with respect to the normal path of travel of the implement, the improvement comprising:

means mounting said assemblies with their laterally inboard ends mutually offset fore-and-aft and overlapping one another transversely with respect to said path of travel when the assemblies are in said widespread position, said mounting means including vertical pivot means adapting the assemblies for horizontal swinging movement from said widespread position to a folded, transport position in which the assemblies extend generally parallel to said path of travel; and means for releasably holding said assemblies in said widespread position, said assemblies being provided with a main fore-and-aft extending frame having the said vertical pivot for one of said assemblies adjacent the rear end of said frame, the said vertical pivot for the other of said assemblies being carried by said one assembly for swinging movement with said one assembly during folding and unfolding thereof.

2. In a tillage implement as claimed in claim 1, wherein said holding means includes tension linkage connected between a non-swinging portion of the implement and said assemblies.

3. In a tillage implement as claimed in claim 1, wherein said assemblies, said mounting means and said holding means are disposed for rearward folding of said assemblies from said widespread position to said folded position.

4. In a tillage implement as claimed in claim 1, wherein said one assembly is located forwardly of said other assembly in said widespread position, there being an arm projecting rearwardly from said one assembly and supporting at its rear end said vertical pivot for said second assembly.

5. In a tillage implement as claimed in claim 4, wherein said assemblies project outwardly and forwardly when in said widespread position, said holding means being operable, when released, to permit said assemblies to swing rearwardly through arcs greater than ninety degrees into said folded position.

6. In a tillage implement as claimed in claim 5, wherein said holding means includes articulated, tension linkage connected between said main frame and said assemblies, said linkage being relatively folded when the assemblies are in said widespread position and being relatively unfolded when the assemblies are in said folded position.

7. In a tillage implement as claimed in claim 6, wherein said holding means further includes latch means for releasably keeping said linkage relatively folded.

* * * * *